United States Patent [19]

Yoon

[11] Patent Number: 5,042,054
[45] Date of Patent: Aug. 20, 1991

[54] METHOD FOR GENERATING A DATA RECEIVING CLOCK OF PAGING RECEIVER

[75] Inventor: Young-Han Yoon, Daegu, Rep. of Korea

[73] Assignee: SamSung Electronics Co., Ltd., Suwon, Rep. of Korea

[21] Appl. No.: 330,179

[22] Filed: Mar. 29, 1989

[30] Foreign Application Priority Data

Mar. 29, 1988 [KR] Rep. of Korea ............... 1988-3403

[51] Int. Cl.$^5$ ............................................. H04L 7/08
[52] U.S. Cl. ................................. 375/108; 375/114; 371/47.1
[58] Field of Search ............... 371/42, 47.1, 57.1; 375/108, 114, 116

[56] References Cited

U.S. PATENT DOCUMENTS

| | | | |
|---|---|---|---|
| 4,453,260 | 6/1984 | Inagawa et al. | 375/116 |
| 4,525,840 | 6/1985 | Heinz et al. | 375/116 |
| 4,756,010 | 7/1988 | Nelson et al. | 375/116 |
| 4,780,892 | 10/1988 | Lagadec | 375/108 |
| 4,803,703 | 2/1989 | DeLuca et al. | 375/114 |
| 4,849,995 | 7/1989 | Takeo et al. | 371/47.1 |
| 4,910,521 | 3/1990 | Mellon | 375/114 |

Primary Examiner—Benedict V. Safourek
Assistant Examiner—Young Tse
Attorney, Agent, or Firm—Robert E. Bushnell

[57] ABSTRACT

A method for generating a clock for data receiving correctly synchronized in each bit even if received data in a paging receiver gets trembled or a duty period of the received data changes. Further, the method detects a duty change of receiving data by counting a period of a corresponding bit during a predetermined number of bits of receiving data. The clock generated is received with correct data in response to the duty change by detecting the duty change of the receiving data and by controlling the clock to a direction of short duty period upon the duty change of receiving data.

14 Claims, 6 Drawing Sheets

METHOD FOR GENERATING A DATA RECEIVING CLOCK OF PAGING RECEIVER

BACKGROUND OF THE INVENTION

1. Field of the invention

The present invention relates to a paging receiver system, and in particular to a clock generating method capable of executing a bit synchronization (SYNC) upon variation of receiving data.

2. General description of the art

FIG. 1 is a system block diagram of a paging receiver of a preferred embodiment of the present invention, which includes: an antenna 1 for receiving a modulation signal of data propagating on air; a RF receiving device 2 for demodulating a modulation signal through the antenna 1 and then reshaping the waveform into digital data; a control device 3 wherein data through the RF receiving device 2 is controlled and various control signals such as a power saving signal are produced; a memory 4 which stores frame data of 3 bits and an address of 16 bits for seeking data of its own among the input data, and which is read by the control device 3 upon an initial time of power on; and alarm device 5 for driving an alarm signal when the own frame data are sought under the control of the control device 3; a speaker 6 for producing an alarm sound according to the alarm signal through the alarm device; and a display device 7 for displaying a received message under the control of the control device 3.

FIGS. 2a–2d are format diagrams of POCSAG (Post Office Committee Standard Association Group) code among codes used in a paging receiver, wherein a POCSAG includes a preamble signal and a number of batches, a batch includes a word SYNC and 8 frames, a frame includes an address codeword of 32 bits and a message codeword of 32 bits, and a transmission speed is 512 bps.

FIG. 3 is a timing chart showing a generation of conventional data receiving clock, which shows that a clock is generated at a half position (½ T) of the receiving data bit.

The operational steps of a paging receiver utilizing the POCSAG code will be explained in accordance with the above-mentioned configuration. Generally, a paging receiver receives a RF (Radio Frequency) signal transmitted by modulating into FSK-NRZ (Frequency Shift Keying-Non Return to Zero) through an antenna 1, and RF receiving device 2 demodulates the RF modulation signal and then reshapes its output waveform into a digital signal of binary code. In addition, the memory 4, preferably a programmable ROM, stores a fixed own address of the paging receiver and the frame data, which constitute dual-address data. Therefore, when the control device 3 receives a message of POCSAG code as shown in FIG. 2, it receives a message of own frame according to the content of the memory 4. These processes are as follows: After detecting a preamble signal received prior to a number of batch message as (2b) in FIG. 2, a bit-synchronization (bit-SYNC) of data receiving clock is adjusted according to the preamble signal detected and the receiving data are checked. Further, after the control device 3 reads out the dual address stored in the memory 4, it stores to the RAM which is an internal memory and stores also an address codeword among the own frame data received as (2d) in FIG. 2 into the internal RAM. Thereafter they are read out and compared respectively at an accumulator ALU. Moreover, a message codeword among the own frame data is stored in a buffer memory of interior, and when the received data compared at the accumulator ALU are judged as proper data, an alarm tone is produced through the alarm device 5 and the speaker 6. At the same time, the corresponding message is displayed through the display device 7.

In a paging receiver as aforementioned a conventional clock generating system for data receiving utilizes either a clock generating method according to PLL (Phase Locked Loop) system as disclosed in U.S. Pat. No. 3,557,308 or another method as disclosed in U.S. Pat. No. 3,801,956 or U.S. Pat. No. 4,554,540, wherein a decoder circuit executes data recovery and clock generation by applying a multiple scan for each bit. Furthermore, there has also been disclosed a clock generating system for data receiving therein applying a simple timer other than the above systems. In such a conventional clock generating system for data receiving, there has been a problem that, in the former case, due to its complicated hardware construction, the integration becomes relatively difficult and the power consumption increases, and also the matching for bit SYNC in response to the variation of data its difficult when a duty period of input data is either changed or trembled at an area of much noise. Moreover, in the latter case, since a high speed clock had to be utilized, a current consumption was increased. And since the multiple scan had to be executed continuously at every data input after a bit is once synchronized, a duration of power supply was reduced. Furthermore, hardware size will be large by using the decoder circuit.

SUMMARY OF THE INVENTION

Therefore, it is an object of the present invention to provide a method capable of generating a clock for data receiving correctly synchronized in each bit even if received data in a paging receiver gets trembled or a duty period of the received data changes.

Another object of the present invention is to provide a method capable of detecting a duty change of receiving data by counting a period of a corresponding bit during a predetermined number of bits of receiving data.

Further object of the present invention is to provide a clock generating method capable of correctly receiving data in response to the duty change by detecting the duty change of the receiving data.

Still further object of the present invention is to provide a method capable of generating a clock for data receiving by controlling the clock to a direction of short duty period upon the duty change of receiving data.

According to one aspect of the present invention, the inventive method includes of: a first step which detects an edge transition of preamble signal after initiating values of a first count (S-count) for storing a predetermined value per each bit, a second count (X-count) for storing number of counted bits and a third count (T-count) for preventing an endless loop; a second step which increases the first count value for every sampling period upon an edge transition at the first step, and checks whether or not the bit value is changed; a third step which adds the first count value of the first bit period when the bit value is changed at the second step; a fourth step which checks whether or not the third count value is generated more than a predetermined value after executing the third step, and if not, then returns to the second step; a fifth step which generates a clock after a half of data bit period from detecting an edge transition of next data when more than a predetermined number of times is detected at the fourth step, and terminates the routine; a sixth step which checks whether or not the second count value is a set bit number after clearing the first count and increasing the second count when being normal at the third step, and when if not, returns to the second step; a seventh step which checks whether or not the counted value is effective after adding the first count value of adjacent two bits in case of detecting the second count value of the set bit number at the sixth step, and if not, increases the third count value and then returns to the fourth step; and an eighth step which calculates a period of a next clock in case of being effective at the seventh step to generate a clock according to the bit duty of receiving data, and then terminates the control sequence.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
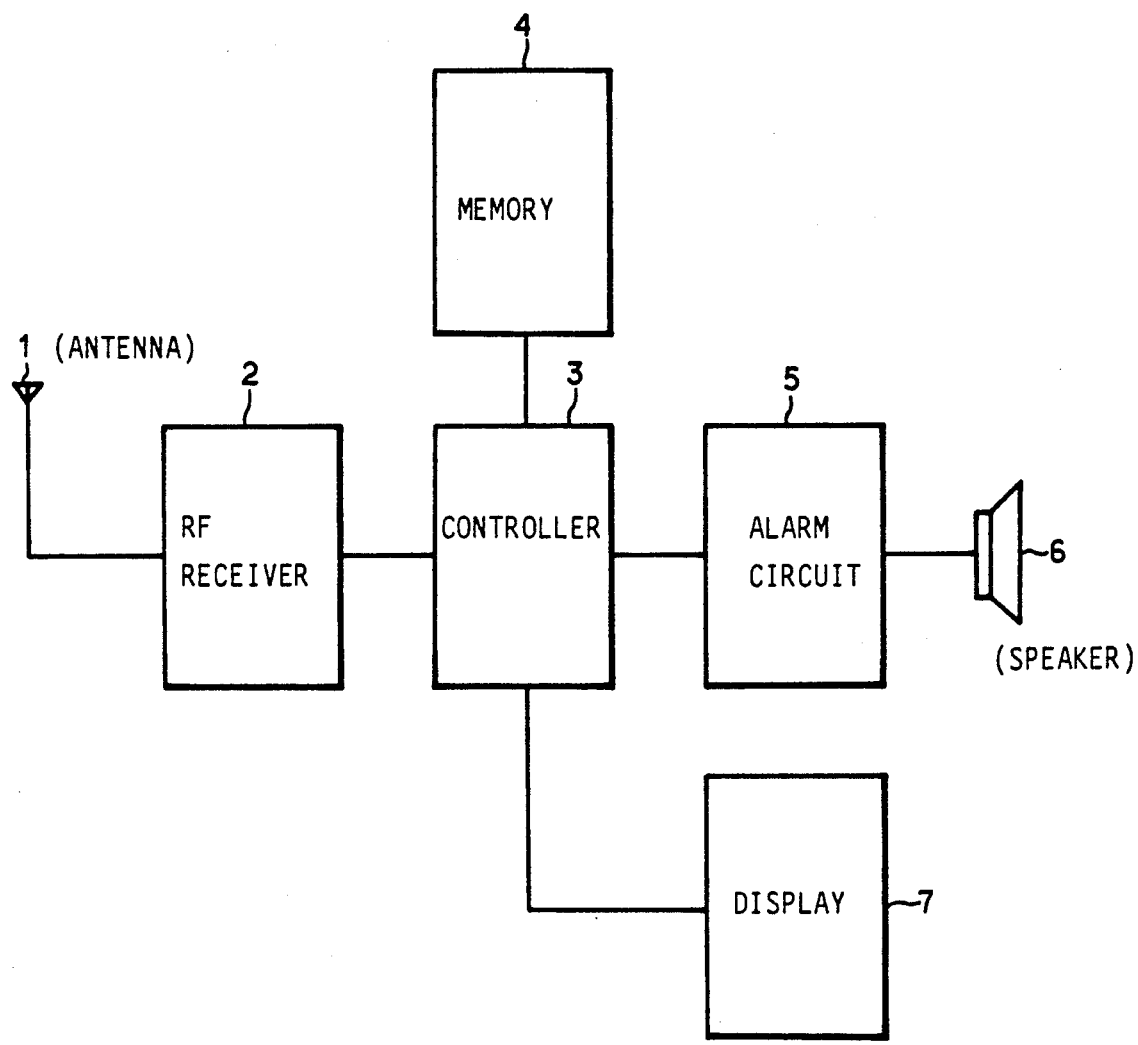
FIG. 1 is a block diagram of typical paging receiver.
Figure 2:
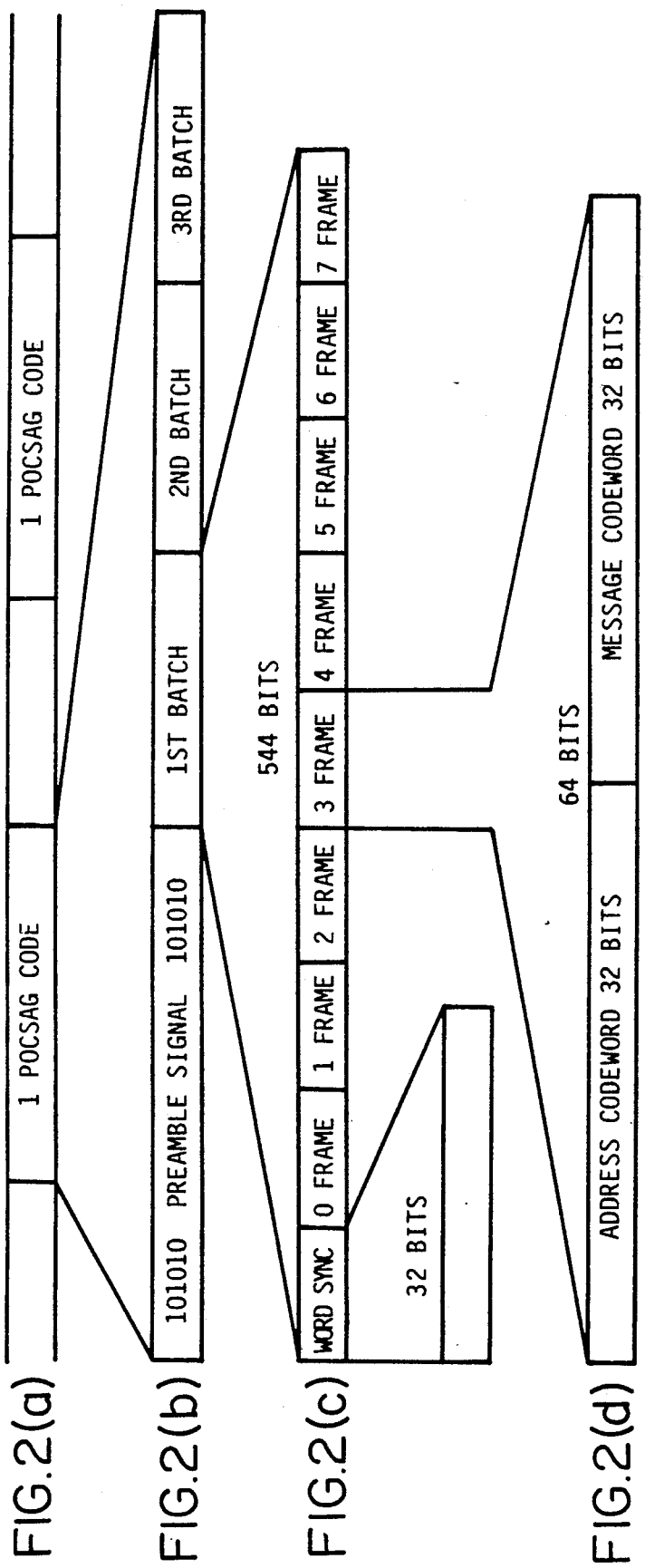
FIG. 2a-2d are exemplary schematic diagrams of a data format.
Figure 3:
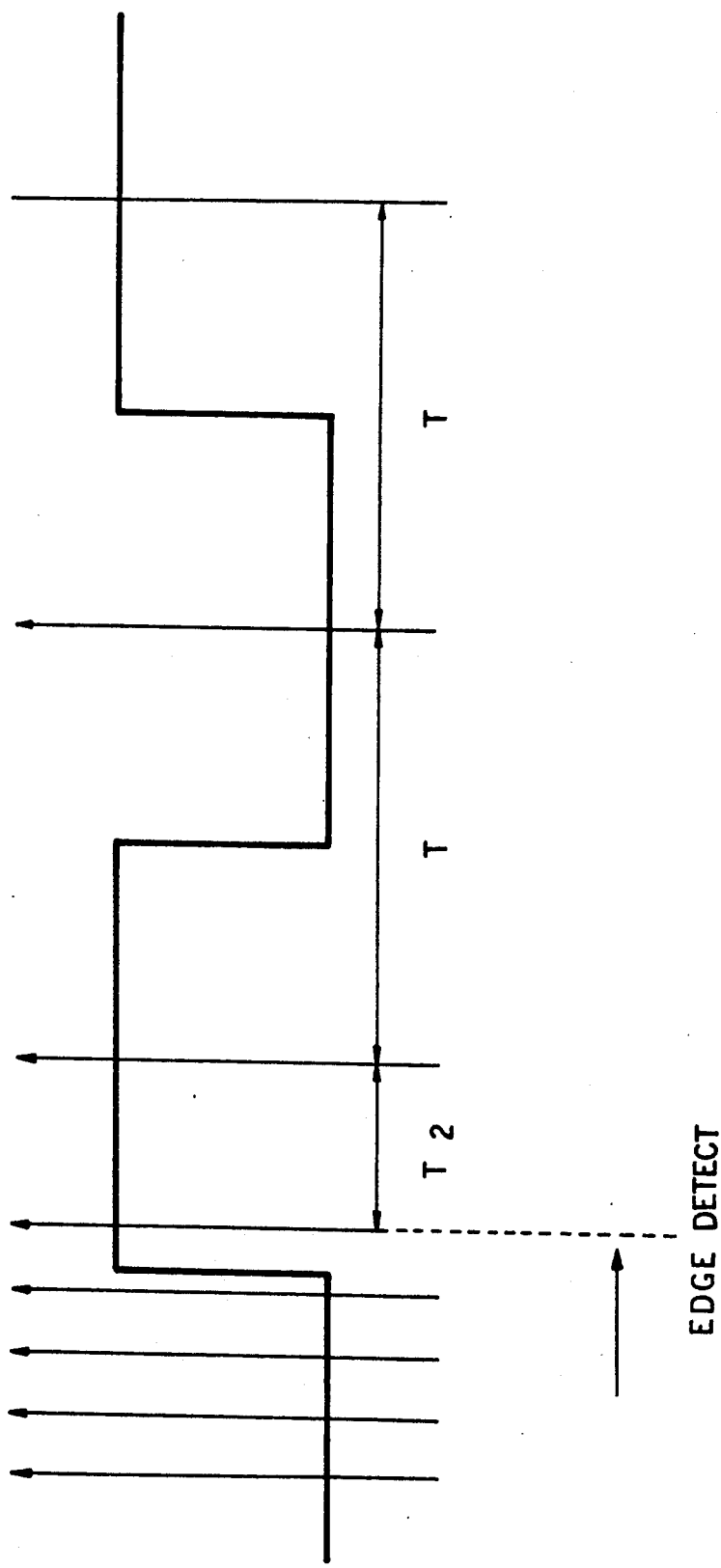
FIG. 3 is a timing chart of a conventional receiving clock generation.

Since a system for executing the present invention has a similar construction as the aforementioned FIG. 1, the reference numbers and their functions of each block are also same, and it is assumed that the format of receiving data is also applied with the same POCSAG code as in FIG. 2.

Figure 4:
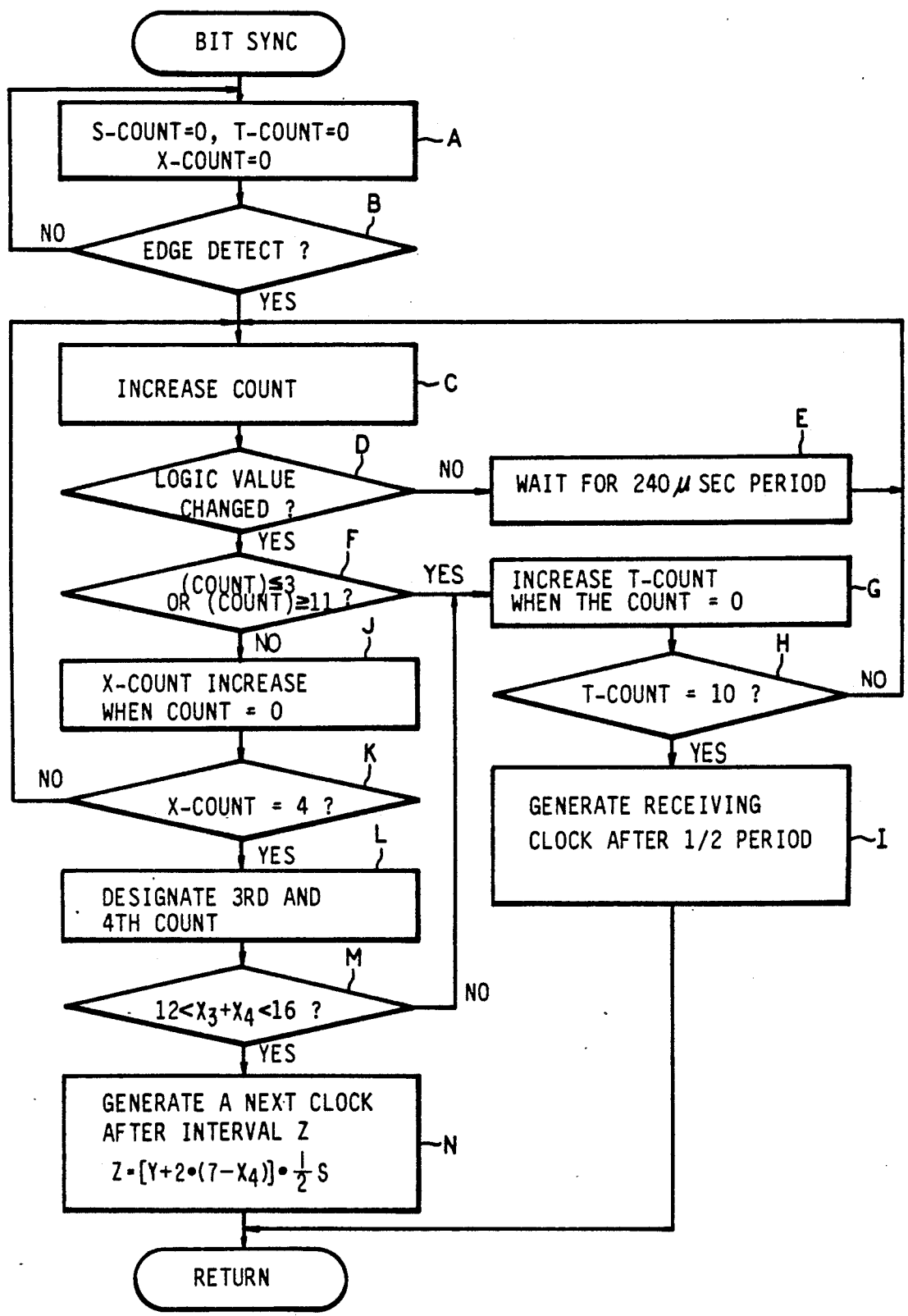
FIG. 4 is a flow chart of a preferred embodiment according to the present invention.

FIG. 4 is a flow chart of a clock generation for data receiving according to the present invention, wherein when digital data through the RF receiver 2 is received, the control device 3 detects a POCSAG code as (2b) in FIG. 2, and when a reversal preamble signal (10101010 ...) is detected (about a degree of 16 bits), the control device 3 generates a clock of bit SYNC. This process of generating a clock is as follows:

(a) a first process which detects an edge transition of preamble signal after initiating a first count (S count) storing a predetermined sample value per each bit, a second count (X count) storing a number of counted bits and a third count (T count) for preventing an endless loop;

(b) a second process which increases the first count value per each sampling period in case of the edge transition at the first process, and detects whether or not the bit value is changed;

(c) a third process which detects whether or not the first count number one bit period is normal in case of the bit value was changed at the second process, and increases the third count value if abnormal;

(d) a fourth process which detects whether or not the third count value is generated more than a predetermined number of times after the third process being executed and returns to second process in case of NO;

(e) a fifth process which renders to generate an clock after ½ bit period after detecting the edge transition of next data if detecting more than predetermined number of times at the fourth process and then terminates a routine;

(f) a sixth process which detects whether or not the second count value is a established bit number after clearing the first count and increasing the second count in case of abnormal at said third process, and returns to the second process in case of NO;

(g) a seventh process which, after the second count value of the established bit number is added at the sixth process, checks whether or not the count value is effective, and if not, then renders to increase the third count value and returns to the fourth process; and (h) an eigth process which generates a clock according to a bit duty of receiving data and then terminates after counting a period of next clock in case of if effective at the seventh process.

Figure 5:
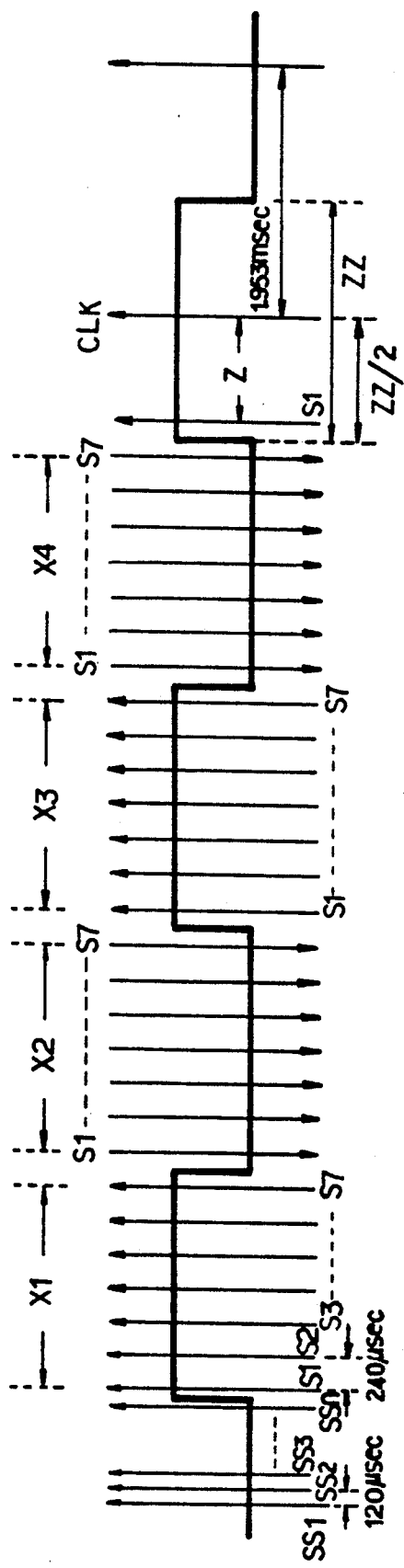
FIG. 5 is a timing chart of receiving clock generation according to the present invention.
Figure 6A:
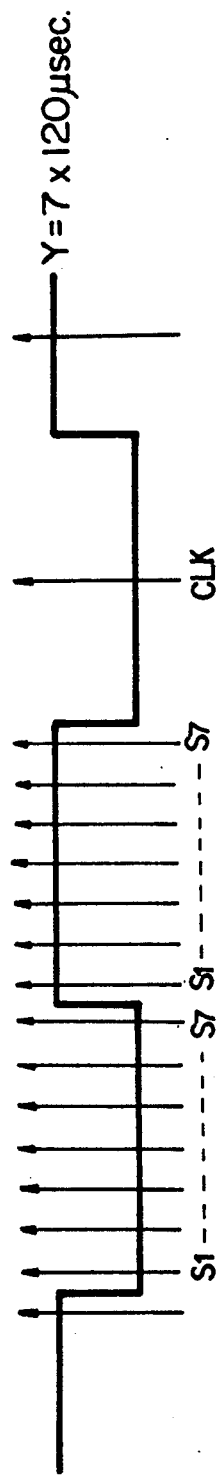
FIGS. 6(a), 6(b) and 6(c) each are examples of timing diagrams showing receiving clock generating timing of FIG. 5.
Figure 6B:
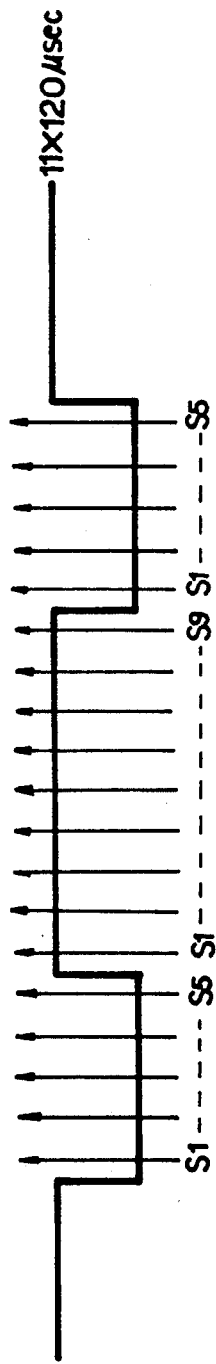
Figure 6C:
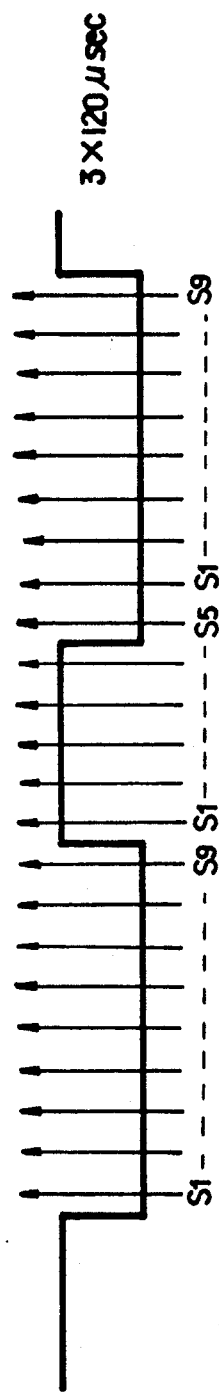

FIG. 5 is a timing chart of a clock generation of bit SYNC according to the receiving data, which shows that the sampling signals (SS1-SSn) of 120 μs period are applied when an edge transition of preamble signal is detected, and the sampling signals (S1-Sn) of 240 μs period which is the first count value are applied once when an edge transition is detected, wherein the sampling signals of 240 μs are generated at seven times (S1-S7) during one bit in case the bit duty is constant, a period of one bit is 1.953 msec, Z is a time duration for clock generation, and a number of bits applied for bit SYNC is assumed 4 (second count=4). FIG. 6 (a) (b) (c) are exemplary timing charts of clock generation for the receiving data bits within an effective range.

The present invention will now be described in detail with reference to the attached drawings, according to the aforementioned configuration. When a POCSAG code as in FIG. 2 is received through the RF receiving device 2, the control device 3 matches a bit SYNC by utilizing a preamble signal. That is to say, a preamble signal (reversal signal of 1010) of more than 576 bits enters prior to data in a POCSAG code as (2b) in FIG. 2, and a preamble signal is received by utilizing a clock of 1.953 msec (512 Hz) according to transmission speed of 512 bps before matching the bit SYNC. However, when only a clock of 1.953 msec period is utilized, correct data can not be received in case the bit duty changes or a trembling of bit exists. Therefore, the present invention generates a clock for data receiving of bit SYNC for the change of corresponding bit after detecting the trembling of data or a duty change of bit.

After an edge of a data being received is detected, a number of samplings of predetermined period is counted until the value of corresponding bit is changed (1→0, 0→1) with respect to the predetermined established bit numbers. When a predetermined sampling number is not counted during the corresponding bit, an operation as above is executed again. At this moment, if a bit SYNC is not obtained during a predetermined number of bits, an edge of next bit is detected by an existing clock generating method and a recovery clock is generated after T/2 period. In case a number of sampling of each bit for the established bit number has an effective value, after controlling a position of recovery clock in accordance with the detected bit duty by utilizing a sampling number of two bits adjoining each other, a receiving clock is generated with a matching data transmission speed. That is to say, when a bit duty ratio is 50:50, since the sampling numbers of each adjacent two bits are equal, the clock is matched at an intermediate position of the bit, and when the bit duty is different, the clock is adjusted to the short duty.

FIG. 4 is a flow chart of a clock generating method of an embodiment according to the present invention, wherein a second count value having an established bit number is set with 4 bits (X1-X4), a first count value that is a sampling number for one bit period is set to 7 (S1-S7) when a bit duty is 50%, a valid sampling number for one bit period is set from 4 to 10, each adjacent two bits are set to third and fourth bits (X3, X4), a valid sampling number these two bits are added is set from 11 to 15, and in case that a predetermined sampling number is not detected more than a predetermined number of times, a third count is assumed 10 (T1-T10) as a count value for an endless loop prevention. An operation flow of above-described process is as follows.

At step A, a first count for storing a sampled number per each bit, a second count for storing counted bit numbers by sampling and a third count for storing a count value for an endless loop prevention, are initiated. At step B, after executing step A, a control device 3 detects the bit change (1→0, 0→1) of preamble signal receiving through the RF receiving device 2, and at step C, a first count which is a sampling value of every 240 μs period is increased. At this moment, at step D, the logical value of bit is checked whether or not it is changed, in case the logical value of bit is not changed, then proceeds to step E and wait for the sampling of 240 μsec period, and when reached to 240 μsec, returns to step C again. When the logical value change (1→0, 0→1) of bits is detected at step D by the repeat operation, it proceeds to a step F and checks whether the number of sampling of corresponding bit (X1-X4) is proper in accordance with the first count value. That is to say, in case the duty ratio of received bit is 50%, though the value of the first count is 7 during one bit period of 1.953 msec, the value of the first count comes to have a difference of about ±3 when the duty ratio is different.

Therefore, at step F, when the value of the first count of corresponding bit (X1-X4) is from 4 to 10, it is acknowledged as proper. At this moment, at step F, when the value of the first count is not valid (in case the value of the first count of bit is less than 3 or more than 1), then it proceeds to step G and increases the value of the third count, which is for preventing the falling to an endless loop according to the abnormal bit duty. After the value of the third count is increased at step G, it then proceeds to step H and checks whether or not the third count value is 10, which is for checking whether or not the bit SYNC is failed more than 10 times by the abnormal bit. When it is within 10 times, it returns to step C, and operates again the above-mentioned operation for a next bit. When more than 10 times are failed for bit SYNC at step H, after detecting an edge transition of next bit with the same known method, it is set to generate a receiving clock to T/2 period and then returns. At this moment at step F, in case that the first count value of corresponding bit (X1-X4) is normal (in case X-count value is in from 3 to 11), it then proceeds to step J, in which after storing the first count value to an internal memory of control device 3, it clears the first count value, and after increasing the second count value which counts the bit numbers (X1-X4) sought the first count value, and then it proceeds to step K to check whether or not the second count value is 4. If the second count value is 4, it is the case that there is detected the sampling numbers for the set bit numbers (X1-X4) utilizing to a bit SYNC, while if the second count value is within 4, it returns again to step C for seeking the sampling numbers of next bit.

At step K, in case that the second count value is 4, it counts a position for generating the SYNC output of next bit with the first count value of the third and fourth bits (X3, X4) at step L, and at step M, it checks whether or not the sampling numbers of two bits added at step L have an effective value. That is to say, in case the first count value of two bits is not within from 12 to 16, since it can not be effective data, it then returns to step G, increases the third count value, and checks the falling to an endless loop.

At step M, when the first count value of the third and fourth bits are effective (12<(X3+X4)<16), then it proceeds to step N, and controls a clock generating point for next bit. At this moment, a clock generating point can be obtained by following expression (1):

$$Z = [Y + 2*(7 - X4)] * \tfrac{1}{2}S \qquad (1)$$

wherein
Z: receiving clock generating point of next bit
X4: first count value of fourth bit (sampling number)
Y: first count value of one bit period (usually 7)
S/2: ½ sampling period.

In generating a receiving clock according to expression (1), when the first count value of aforementioned two bits is 14 at step L, this represents that the bit duty ratio is 50%:50%, in which case when a bit synchronized clock is generated after Z time interval, a receiving clock is generated at an intermidiate position of a next bit as 6a in FIG. 6. At this moment, in case a clock duty of X4 is less than 50%, as a clock for receiving is generated in the middle of the bit as waveform 6a in FIG. 6 and thereby data loss may arise, it is made so as to generate as 6b in FIG. 6. Waveform 6b is a case that X4 is 5, wherein according to expression (1), it becomes.

$$Z = (Y + 2*2) * \tfrac{1}{2}S = 11*120\mu s$$

Therefore, a clock for receiving is generated after 1.34 msec from the detection of edge transition. Further, in case a clock duty of X4 exceeds more than 50%, it is made so as to generate as waveform 6c in FIG. 6. Waveform 6c is a case that X4 is 9, wherein according to expresion (1) it becomes.

$$Z = (Y - 2*2) * \tfrac{1}{2}S = 3*120\mu s$$

Therefore, a clock for receiving is generated after 360 μs from detecting an edge transition.

A clock for receiving generated by applying the method such as the aforementioned is as follows.

TABLE 1

| X4 | Z | Remark |
|----|---|--------|
| 4  | Y + 2 * 3 | 12 * 120 μs = 1.44 msec |
| 5  | Y + 2 * 2 | 11 * 120 μs = 1.32 msec |
| 6  | Y + 2 * 1 | 9 * 120 μs = 1.08 msec |
| 7  | Y | 7 * 120 μs = 840 μsec |
| 8  | Y − 2 * 1 | 5 * 120 μs = 600 μsec |
| 9  | Y − 2 * 2 | 3 * 120 μs = 360 μsec |

TABLE 1-continued

| X4 | Z | Remark |
|---|---|---|
| 10 | Y − 2 * 3 | 1 * 120 μs = 120 μsec |

As in the above table 1, the clock generating point is controlled such that the clock for receiving is generated in the middle position of the bit in case the duty of bit is 50%:50%, while the clock for receiving is generated toward a direction of short duty in case the duty of bit is changed.

As described above, since a generating point of a clock for receiving can be controlled either in case of trembling of receiving data or a duty change, a message can be received correctly and a calling rate can be improved. Furthermore, since the clock for receiving can be generated by software, a separate complicated hardware is not required in use, thereby giving an advantage that a paging receiver can be small size.

While the invention has been particularly shown and described with reference to a preferred embodiment, it will be understood by those skilled in the art that modifications in detail may be made without departing from the spirit and scope of the invention.

What is claimed is:

1. A method for generating a clock for data receiving or bit synchronization according to a preamble signal of Post Office Committee Standard Association Group code in a paging receiver, comprising the steps of:
   detecting an edge transition of a preamble signal after initializing values of a first count for storing a predetermined value per each bit, a second count for storing a number of counted bits and a third count for preventing an endless loop;
   increasing, in a first increasing step, the value of said first count for every sampling period upon detection of an edge transition during said detecting step, and checking in a first checking step whether the value per each bit is changed;
   adding the value of said first count of the first bit period when a change in the value per each bit is detected at said first checking step;
   checking, in a second checking step, whether the value of said third count generated is greater than a predetermined value after executing said adding step, and if not, returning to the first increasing step;
   generating a clock signal after one-half of a data bit period upon detecting an edge transition of subsequent data when a third count of greater value than a predetermined number is detected at said second checking step, and terminating the routine;
   checking in a third checking step whether the value of said second count is a set bit number after clearing the first count and increasing in a second increasing step the value of the second count when a first condition is satisfied at said adding step, and if said first condition is not satisfied, returning to the first increasing step;
   checking in a fourth checking step by adding the value of said first count of adjacent two bits is effective if the second count value of said established bit number at said fourth checking step is detected to be the set bit value, and if not, increasing the third count value and then returning to the second checking step; and
   calculating a period of a next clock signal if said counted value is determined to be effective at said fourth checking step to generate a clock signal according to the bit duty of received data, and then terminating the control sequence.

2. A method according to claim 1, wherein at said first increasing step, the sampling period is 240 μsec, and when the bit period is fifty percent, a number of the sampling signals of one bit period is seven.

3. A method according to claim 2, wherein at said adding step, when the number of said first count of one bit period is a value between 4 and 10, the first condition is satisfied.

4. A method according to claim 3, wherein at said generating step, when said third count value is not less than ten, bit synchronization is deemed to fail and a clock for data receiving is made to generate at a point of a one-half bit period of the preamble signal.

5. A method according to claim 4, wherein at said third checking step, the set bit number is four bits.

6. A method according to claim 5, wherein at said fourth checking step, a bit is considered an effective bit only when said first count value of two adjacent bits is within a range of thirteen to sixteen, the adjacent two bits being the third and fourth bits.

7. A method according to claim 6, wherein at said calculating step, said clock is controlled to generate toward the direction of shorter duty according to a duty period of a subsequent bit and a duty period of the fourth bit.

8. A method for generating a clock signal for data receiving or bit synchronization according to a preamble signal of Post Office Committee Standard Association Group code in a paging receiver, comprising the steps of:
   initiating first, second and third counts;
   detecting a bit change in a received preamble signal;
   increasing, in a first increasing step, the first count upon detection of a bit change;
   checking, in a first checking step, for changes in the logical value of the bit;
   delaying and returning to said step of increasing, if no change has occurred;
   checking, in a second checking step, the first count value for accordance with a first sampling range, if a change has occurred;
   increasing, in a second increasing step, the third count, checking, in a third checking step, if the third count is a value equal to a predetermined value, returning to said first increasing step, if the third count is a value less than ten, and generating a receiving clock signal, if the third count is a value greater than a first predetermined number, if the first count is not in accordance;
   storing the value of the first count, clearing the first count and increasing the value of the second count, if the first count is in accordance;
   checking, in a fourth checking step, if the value of the second count is equal to an established bit number;
   returning to said first increasing step, if the value of the second count is less than a second predetermined number;
   checking, in a fifth checking step, if the value of the addition of two adjacent bits of said first count is within an established range, if the value of the second count is equal to four;
   returning to said second increasing step, if the value of the addition is not within a second sampling range; and generating a clock for a next bit, if the first count is within the established range.

9. A method as claimed in claim 8, wherein said first count is for obtaining a predetermined value per each bit, said second count is for obtaining a number of counted bits and said third count is for preventing an endless loop.

10. A method as claimed in claim 8, wherein the first count is increased for each sampling period of 240 μsec having a bit change, during said first increasing step, and having a number of sampling signals of one bit period equal to seven, when the bit period is fifty percent.

11. A method as claimed in claim 8, wherein if the value of said first count is determined, during said second checking step, to be in accordance if the number of the first count has a value between a first sampling range of three and eleven.

12. A method as claimed in claim 8, wherein if said value of said third count is determined to be not less than ten in said second increasing step, bit synchronization is deemed to fail and a clock for data receiving is made to generate at a point of a one-half bit period of the preamble signal.

13. A method as claimed in claim 8, wherein the established bit number in said third checking step is four.

14. A method as claimed in claim 8, wherein a bit is considered an effective bit when the value of said first count of two adjacent bits is determined to be within a range of thirteen to sixteen in said fifth checking step, the adjacent two bits being the third and fourth bits.

* * * * *

UNITED STATES PATENT AND TRADEMARK OFFICE
CERTIFICATE OF CORRECTION

PATENT NO. : 5,042,054  
DATED : August 20, 1991  
INVENTOR(S) : Young-Han YOON

Page 1 of 6

It is certified that error appears in the above-identified patent and that said Letters Patent is hereby corrected as shown below:

<u>ON THE TITLE PAGE,</u>
<u>IN THE ABSTRACT</u>

Line 1, insert --signal-- after "clock", and insert --with data received being-- after "receiving";

Line 2, change "each" to --every--;

Line 5, change "duty change" to --a change in duty period--, and change "receiving" to --received--;

Line 7, change "receiving" to --received--;

Line 11, change "duty change of receiving" to --change in duty period of the received--.

Column 1,  Line 10,  change "receiving" to --received--;

Line 15,  change "on" to --in--;

Line 25,  change "the" to --its--;

Line 33,  insert --unit of-- after "a" (second occurrence).

UNITED STATES PATENT AND TRADEMARK OFFICE
CERTIFICATE OF CORRECTION

PATENT NO. : 5,042,054

DATED : August 20, 1991

INVENTOR(S) : Young-Han YOON

It is certified that error appears in the above-identified patent and that said Letters Patent is hereby corrected as shown below:

Column 1,    Line 34,    insert --code-- after "SAG":

Line 39,    change "a" (second occurrence) to --the--, and insert --a-- after "of";

Line 40,    insert --signal-- after "clock";

Line 41,    insert --signal-- after "clock", and change "receiving" to --received--;

Line 49,    insert --a-- after "and";

LIne 53,    change "fixed own" to --its own fixed--;

Line 56,    insert --its-- after "of";

Line 59,    delete "message";

Line 60,    change "as" to --messages as is shown by waveform--, and insert --a-- after "of";

Line 61,    insert --signal-- after "clock";

Line 62,    change "receiving data are" to --received data is--;

Line 66,    change "the" to --its--.

UNITED STATES PATENT AND TRADEMARK OFFICE
CERTIFICATE OF CORRECTION

PATENT NO. : 5,042,054
DATED : AUgust 20, 1991
INVENTOR(S) : Young-Han YOON

It is certified that error appears in the above-identified patent and that said Letters Patent is hereby corrected as shown below:

Column 2, Line 2, change "a buffer memory of interior" to --an interior buffer memory--;

Line 9, insert --signal-- after "clock";

Line 27, delete "a" (second occurrence);

Line 30, delete "a" (second occurrence);

Line 37, insert --signal-- after "clock";

Line 39, change "trembled" to --varied--;

Line 42, change "duty change of receiving" to --change in duty period of received--;

Line 44, insert --reception of-- before "a", and delete "receiving";

Line 47, insert --signal-- after "clock";

Line 48, change "the duty change" to --a change of duty period--;

Line 49, change "of the receiving" to --in the received--;

Line 51, change "for data" to --signal for data received--;

Line 52, delete "receiving", and change "to" to --signal in--, and change "short" to --shorter--.

UNITED STATES PATENT AND TRADEMARK OFFICE
CERTIFICATE OF CORRECTION

PATENT NO. : 5,042,054

DATED : August 20, 1991

INVENTOR(S) : Young-Han YOON

It is certified that error appears in the above-identified patent and that said Letters Patent is hereby corrected as shown below:

Column 2, Line 53, change "the duty change of receiving" to --occurrence of change in a duty period in received--;

Line 56, insert --a-- after "of";

Line 59, insert --the-- after "storing";

Column 3, Line 2, insert --signal-- after "clock", and insert --the-- after "of";

Line 11, insert --an-- after "of";

Line 16, insert --signal-- after "clock";

Line 17, insert --signal-- after "clock", and change "of receiving" to --period of received--;

Line 36, insert --the-- after "showing";

Line 57, insert --the-- before "preamble";

Line 58, insert --and-- before "storing";

Line 59, insert --and-- before "storing";

Line 67, insert --for-- before "one";

UNITED STATES PATENT AND TRADEMARK OFFICE
CERTIFICATE OF CORRECTION

PATENT NO. : 5,042,054
DATED : August 20, 1991
INVENTOR(S) : Young-Han YOON It is certified that error appears in the above-identified patent and that said Letters Patent is hereby corrected as shown below:

Column 4, Line 4, insert --the-- after "to";

Line 5, change "renders to generate an clock" to --generates a clock signal--;

Line 7, insert --the-- before "next", and insert --a-- after "than";

Line 18, change "renders to increase" to --increases--;

Line 20, insert --signal-- after "clock";

Line 21, insert --period-- after "duty";

Line 22, insert --the-- before "next", and change "in case of" to --signal--;

Line 46, insert --signal-- after "clock";

LIne 50, insert --period-- after "duty";

Line 52, insert --signal-- after "clock";

Line 54, change "change of bit" to --period change of the data bits--.

UNITED STATES PATENT AND TRADEMARK OFFICE
CERTIFICATE OF CORRECTION

PATENT NO. : 5,042,054

DATED : August 20, 1991

INVENTOR(S) : Young-Han YOON

It is certified that error appears in the above-identified patent and that said Letters Patent is hereby corrected as shown below:

Claim 1, Column 7, Line 35, change "said" to --the--;

Line 40, change "said" to --the--;

Line 44, change "said" to --the--;

Line 54, change "a set" to --an established--;

Line 60, insert --,-- after "step".

Signed and Sealed this

Seventeenth Day of November, 1992

Attest:

DOUGLAS B. COMER

Attesting Officer　　Acting Commissioner of Patents and Trademarks